United States Patent [19]
Sugiura et al.

[11] Patent Number: 5,525,884
[45] Date of Patent: Jun. 11, 1996

[54] AUTOMATICALLY GUIDED VEHICLE

[75] Inventors: Noriyasu Sugiura; Yukio Hisada; Tadashi Ike; Motohiro Sugiyama, all of Shizuoka, Japan

[73] Assignee: Yazaki Industrial Chemical Co., Ltd., Japan

[21] Appl. No.: 386,763

[22] Filed: Feb. 10, 1995

[51] Int. Cl.$^6$ .................................................... G05D 1/03
[52] U.S. Cl. ........................... 318/587; 318/580; 180/168
[58] Field of Search .................................. 318/580, 587; 180/167, 168; 364/424.01, 424.02, 424.05, 443

[56] References Cited

U.S. PATENT DOCUMENTS

| | | |
|---|---|---|
| 3,642,087 | 2/1972 | Sampey . |
| 4,593,239 | 6/1986 | Yamamoto ............................ 318/587 |
| 5,218,542 | 6/1993 | Endo et al. ...................... 364/424.02 |

FOREIGN PATENT DOCUMENTS

| | | |
|---|---|---|
| 62-263511 | 11/1987 | Japan . |
| 62-288908 | 12/1987 | Japan . |
| 62-288910 | 12/1987 | Japan . |
| 62-199811 | 12/1987 | Japan . |
| 63-126907 | 8/1988 | Japan . |

Primary Examiner—Bentsu Ro
Attorney, Agent, or Firm—Ronald P. Kananen

[57] ABSTRACT

A magnetically guided unmanned vehicle system to carry various loads along a guide path of a closed loop which comprises guide path consists of magnetic tape, a magnetic guide type steering drive unit having a magnetic sensor to detect magnetism from said tape and a drive wheel, said steering drive unit having a driving means to drive said drive wheel and a steering means controlled automatically by signals detected by said magnetic sensor, a trolley which has wheels at each of the four corners of the lower surface of a chassis thereof, the front said wheels having a universal casters, and a carriage shelf assembly which has one or a plurality of horizontal automatic roller conveyer(s) as shelves. The magnetically guided vehicle can be constructed by combining the trolley, the steering drive unit and the carriage shelf assembly and the trolley can be used for its original purposes by disassembling such parts. The drive wheel can be changed from a position wherein the wheel touches the floor with a pressure sufficient for running to a position wherein the wheel is suspended with a clearance above the floor.

4 Claims, 9 Drawing Sheets

AUTOMATICALLY GUIDED VEHICLE

BACKGROUND OF THE INVENTION

This invention relates to an unmanned, magnetically guided vehicle which carries various loads in a fully automated fashion, in a factory or a warehouse, along a guide path of a closed-looped magnetic tape.

Various kinds of automatically guided vehicles (AGV) which carry various loads along preset guide paths in factories, warehouses and golf courses have been developed and put into practice both domestically and abroad. In the Japan's Patent Publication No. S62-268511, for example, a motion controller for a magnetically guided vehicle which is equipped with a sensor to detect a magnetic guide band for steering control is disclosed. In the Japan's Patent Publication No. S62-288908 a guide system for a magnetically guided vehicle which uses magnetic guide band is disclosed. In the Japan's Patent Publication No. S62-288910 a motion control device for AGVs in a system which includes paths on which AGVs have priority paths and non-priority paths which join the priority paths is disclosed. In the Japan's Patent Publication No. S68-91708 a guide system for AGVs wherein a sensor-active area which is recognized by a sensor for steering control for each of the AGVs is provided, and each AGV contains a guide device which controls steering by keeping the boundary between said sensor-active area and the non-active area as close as possible to a predetermined position using the information from the sensor is disclosed. Further, in the Japan's Patent Publications No. S62-199811 and No. S63-126907 bands for magnetic guidance are disclosed.

As seen from the above, both technical development and practical use of AGVs seem to have reached a high level of sophistication. But, possible areas of application, equipment costs and installation, etc. are fields in which there is still room for study. A vehicle which is constructed as a proper AGV, for example, develops a lot of resistance (especially magnetic resistance of the motor) when it is pushed to a place off the magnetic guide path in order to change paths or to moved the AGV to a charging station in order to charge the battery, making it very difficult to push it by hand.

The primary object of the invention is, therefore, to provide a magnetically guided vehicle system with excellent versatility and variability using guide paths consisting of magnetic tape laid along the path lines and a magnetic-guided steering drive unit which has a magnetic sensor to detect magnetism from the tape. The vehicle system also has a drive wheel, a driving means to drive the drive wheel and a steering means for the wheels, each provided under an attachment plate, a trolley to which the attachment plate for the steering drive unit is attached on the lower surface of the chassis, and a carriage shelf assembly provided with one or more layers of automatic conveyers mounted on the chassis of trolley. The magnetically guided vehicle would be able to be used either as a magnetically guided vehicle system when the trolley, steering drive unit and carriage shelves are combined, or as an normal trolley when disassembled.

Another object of the invention is to provide a magnetically guided vehicle which has the drive wheel of the steering drive unit touching the floor with a pressure sufficient for running and can be changed so that the drive wheel is suspended above the floor, making it very convenient for hand pushing when the vehicle must be moved to a place without magnetic guide tape in order to change paths or to a charge station, having no guide path, for charging batteries.

SUMMARY OF THE INVENTION

The magnetically guided vehicle system according to the present invention comprises guide paths consisting of magnetic tape laid along the path lines and a magnetic-guided steering drive unit which has a magnetic sensor to detect magnetism from the tape. The MGV has a drive wheel, a steering drive unit with a driving means to drive the drive wheel and a steering means, both provided under an attachment plate and controlled automatically through a control means that processes signals detected by the magnetic sensor. The MGV further has a trolley, which has a wheel at each of the four corners of the lower surface of the chassis, the front wheels having a universal caster, and is provided with an attachment plate for the steering drive unit fixed on the lower surface of the chassis. The MGV also has a carriage shelf assembly which has one or more horizontal automatic roller conveyers as shelves mounted on said chassis of the trolley. The attachment plate is removably fixed to the lower surface of the chassis and the carriage shelves are also removably mounted on the chassis. The conveyers are operated automatically according to a transmitted signal when a load handling position on the path is detected.

The drive wheel of the steering drive unit is attached to a mechanism which moves vertically by a lever which changes the wheel from a position in which the wheel touches the floor, pushing up the attachment plate fixed on the lower surface of the chassis with the pressure necessary for running, to a position in which the wheel is suspended off the floor. A changeover handle to move the drive wheel vertically is provided at the rear of the chassis.

The frame for the chassis and the carriage shelf assembly are constructed by connecting resin-coated steel pipes with connecters. The attachment plate of the steering drive unit is detachably mounted by fastening hold plates which receive the resin-coated steel pipes to attachment seats of the attachment plate with bolts. The carriage shelf assembly is mounted detachably by two-piece connecters fastened with nuts and bolts that clamp symmetrically the resin-coated steel pipes constituting the frame of the carriage shelf assembly and the steel pipes constituting the frame of the chassis of the trolley.

The automatic conveyers of the carriage shelf assembly consist of rollers made of resin-coated steel pipes cut to suitable lengths and supported rotatably by bearing means at both ends of each pipe. There may be a number of rollers arranged parallel with each other at a constant pitch and are driven in a common direction at a common speed. Sensors are provided at both the entrance and exit sides of each of the roller conveyers which sense on-coming and off-going loads. Stopper means that can be either turned up or turned down are provided at both the entrance and exit sides for stopping loads.

The magnetically guided vehicle is started through manipulation of a start button by an operator. The software of the control device is programmed in such a way that, after starting, the system will run repeatedly as an unmanned operation. The magnetic sensor detects magnetism (magnetic force line) that is emitted from the magnetic tape laid along the path on the floor. The control device processes the detected magnetism, drives the steering motor of the steering device and thereby steers the drive wheel, which enables the vehicle to run along the path without human operation. Another magnetic sensor (N/S magnetic sensor) detects S and N poles of small pieces of magnetic tape laid independently at load handling positions (loading or unloading positions) and receives signals for decelerating or stopping. The signals are also processed by the same control device for control of the driving device, which decelerates or stops the drive wheel. The stop signal is also used as a start signal for the roller conveyers of the carriage shelf assembly and controls the drive motors automatically for starting rotation in the direction for loading or for unloading. The drive motors for the rollers are stopped by a signal transmitted from either of the sensors when a load enters or leaves the conveyer. The stopper means prevents overrun or a dropping of the load from the conveyer. In this way, the vehicle is operated without human manipulation, repeating automatically a cycle of runs along the guide path by halting, loading and unloading.

By attaching the attachment plate on the lower surface of the chassis of the trolley and mounting the carriage shelf assembly on the upper surface of the chassis of the trolley, the magnetically guided vehicle (AGV) is completed. Any type of trolley, new or conventional, can be used as long as the attachment of the attachment plate is compatible with it. If the magnetically guided vehicle is disassembled in reverse, the trolley can be used for its original purposes.

As the drive wheel is changed from the position in which it is touching the floor with a pressure sufficient for running, to being suspended with a clearance between it and the floor, by manipulation of the changeover handle, the magnetic resistance of the drive device (especially the drive motor) is completely resolved and the vehicle can then be relatively easily moved by hand off the guide path when the path is changed through renewal of the guide tape or when the vehicle is being transferred to a charging station that has no guide path.

Since the vehicle is constructed by connecting the resin-coated steel pipes of the frames of the chassis of the trolley and of the carriage shelf assembly, it is more resilient and there is a lower probability of a person being hurt or an object colliding with it being damaged as compared to vehicles made of shape steel or uncoated metal pipes. Such pipes are excellent in terms of corrosion resistance (resistance to acid, alkali, water) and, therefore, convenient for use in places where corrosion is a matter of concern. Further, the attachment plate for the vehicle according to the present invention is easily detachably attached to the chassis of the trolley with the hold plates and bolts, as is the carriage shelf assembly with the two-piece connecters, nuts and bolts.

As is evident from the above, in the magnetically guided vehicle system according to the present invention, it is very easy to change or modify the guide path by placing and/or peeling off the tape. Moreover, a magnetically guided vehicle can be constructed by combining a trolley, a steering drive unit and a carriage shelf assembly and the trolley can also be reduced to its original form and be used for its original purposes by disassembling the vehicle, which gives the vehicle excellent versatility and variability. According to the present invention, any type of trolley, new or conventional, can be used as long as the specification is compatible with the construction of the vehicle according to the present invention. Further, by changing the drive wheel from the position in which it touches the floor with a pressure sufficient to run to the suspended position, the vehicle can be very conveniently and easily moved by hand off the guide path in order to change paths or to transfer it to a charging station for battery charging.

DETAILED DESCRIPTION

Figure 1:
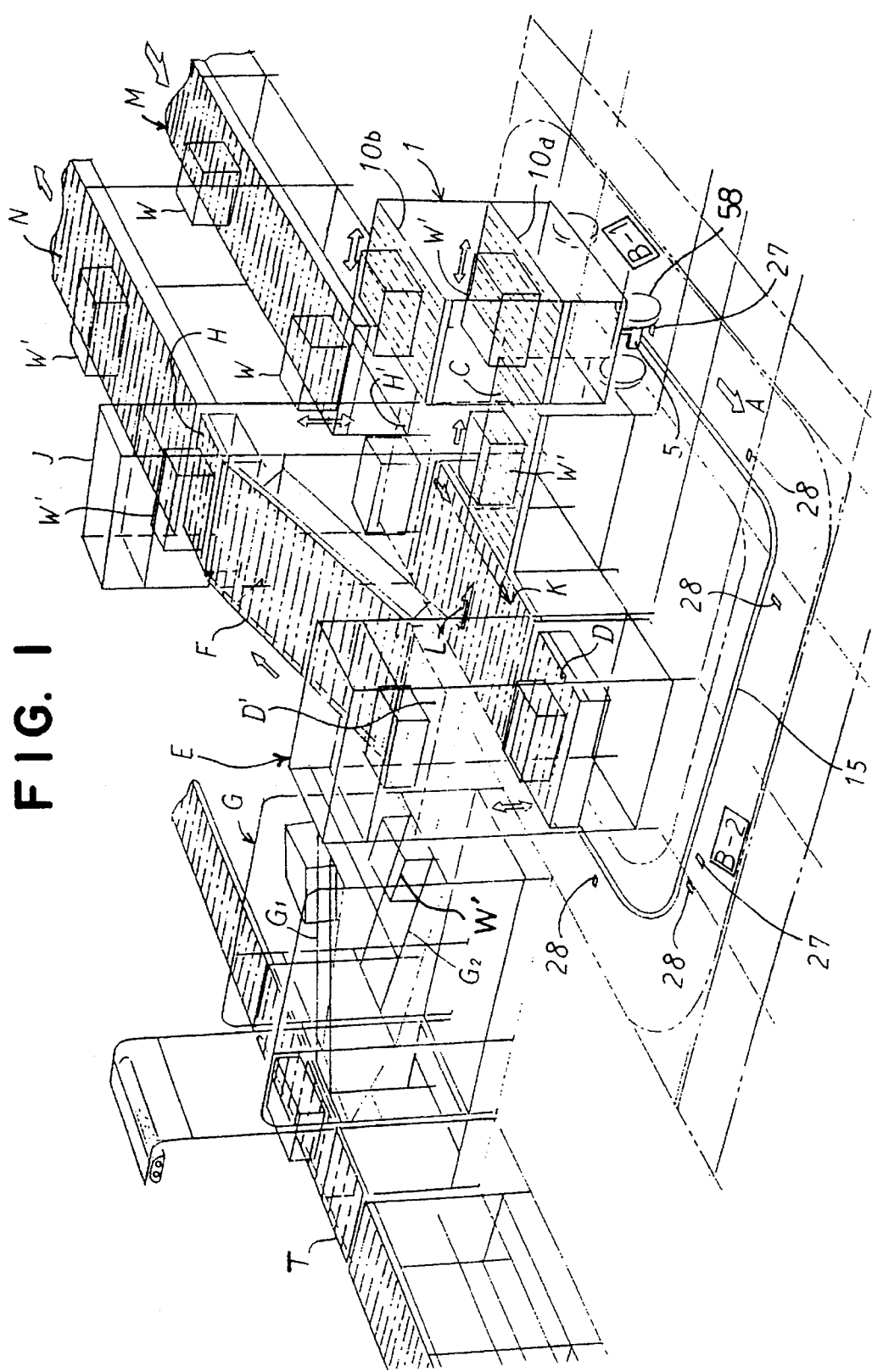
FIG. 1 is a diagonal view of an example of the use of the magnetically guided vehicle according to the present invention.

The embodiment of the invention shown in the drawings will be described below.

Figure 2:
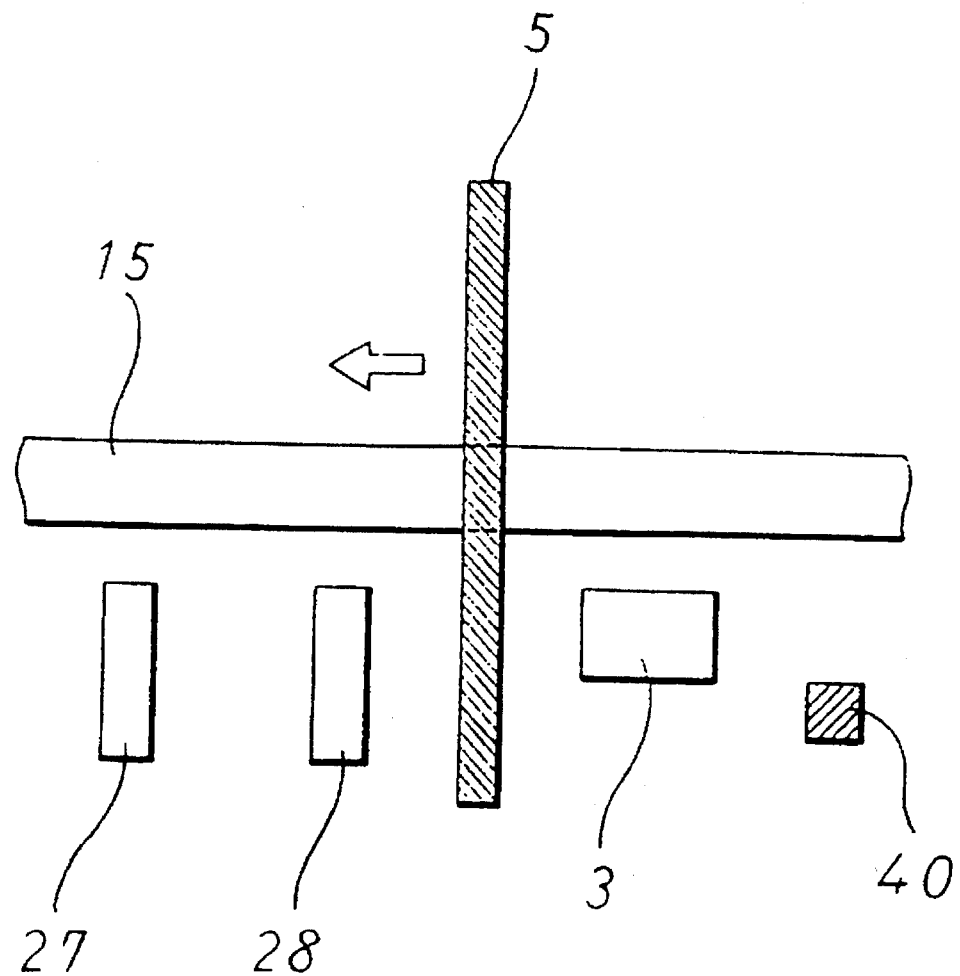
FIG. 2 is a plan view showing the positional relation of magnetic tape and the sensor.

FIG. 1 shows an example of the use of the magnetically guided vehicle according to the present invention (abbreviated hereinafter as AGV ). The AGV runs in the direction of the arrow A continuously without human operation on a path formed as a closed loop with magnetic tape 15 laid along the path line, the control process being such that a magnetic sensor 5 detects the intensity and direction of the magnetic force lines from the magnetic tape 15 and the drive wheel 3 is driven and steered by a steering motor which is controlled in such a manner as to keep the left side (or the right side) edge line at a predetermined position of the sensor 5. At load handling positions (halt positions) B-1, B-2, and so on, magnetic tape pieces of N poles 28 and S poles 27 are attached to the floor with a predetermined spacing along said magnetic tape 15 as shown in FIG. 2. The AGV which runs without human operation decelerates (or accelerates in some cases, such as after having moved through a curve) promptly as an S/N magnetic sensor 40 detects one of the N pole magnetic tape pieces 28 and stops as the sensor detects one of the S pole magnetic tape pieces 27. In FIG. 1, for example, a load W carried in by a carry-in conveyer M is transferred to another conveyer H' by way of the lower automatic roller conveyer 10a as the AGV halts temporarily at the end of said carry-in conveyer M, position B-1. The load W then moves in the direction designated by the arrow, and, after other work, sorting, etc., enters a platform D of an elevator E. Meanwhile, the AGV advances along the guide path and, halting at the stop position B-2, receives said load W on the upper automatic roller conveyer 10b from the platform D which has been waiting at lifted position D'. The AGV then moves ahead further and stops at the junction with a flow rack G and transfers the load W to the upper flow rack G1. At an assembly conveyer line T, in front of said flow rack G, workers take out the contents from the load W for assembly work and the empty box W' is returned by way of the lower flow rack G2. The empty box W' is received on the lower roller conveyer 10a as a return load. Then, the AGV again stops at the end of the carry-in conveyer M, position B-1 and sends out the empty box W' to a transfer conveyer H'. Further, it also relays the load W that comes from the carry-in conveyer M to the transfer conveyer H'. The empty box W' put on said transfer conveyer H' is checked by a watch sensor (not shown) while proceeding on a conveyer K, and, being recognized as empty, it is directed to another transfer conveyer C that is perpendicular to the conveyer K by a direction changer L. Then, the empty box W' is sent onto the lower automatic conveyer 10a of the AGV that has advanced along the guide path and halted at the load handling position B-1. The AGV, after the watch sensor has confirmed the completion of the loading of the returned load, that is, the empty box W', starts moving automatically and stops at the next load handling position B-2. At this position, the AGV moves the empty box W' form the lower automatic conveyer 10a onto the conveyer of the platform D of the elevator E. The empty box on the platform D is then lifted by the elevator to the height of the entrance level D' of an inclined conveyer F and then, via said inclined conveyer F, is moved on the carry-out conveyer N in the direction designated by the arrow and returns to the original supply site. These processes and actions constitute a cycle which is repeated.

Figure 3:
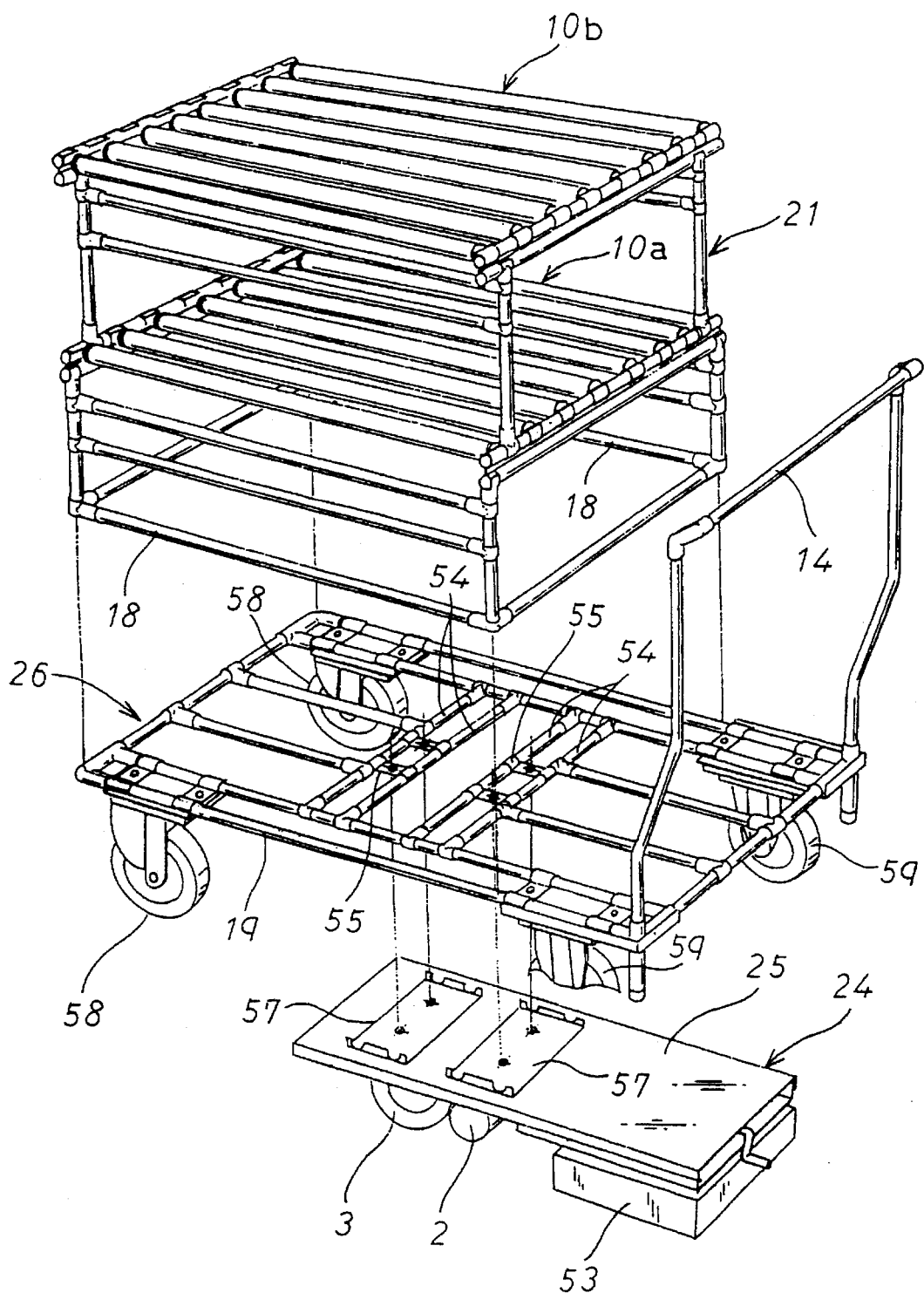
FIG. 3 is a diagonal view showing the components of the magnetically guided vehicle in a disassembled condition.
Figure 4:
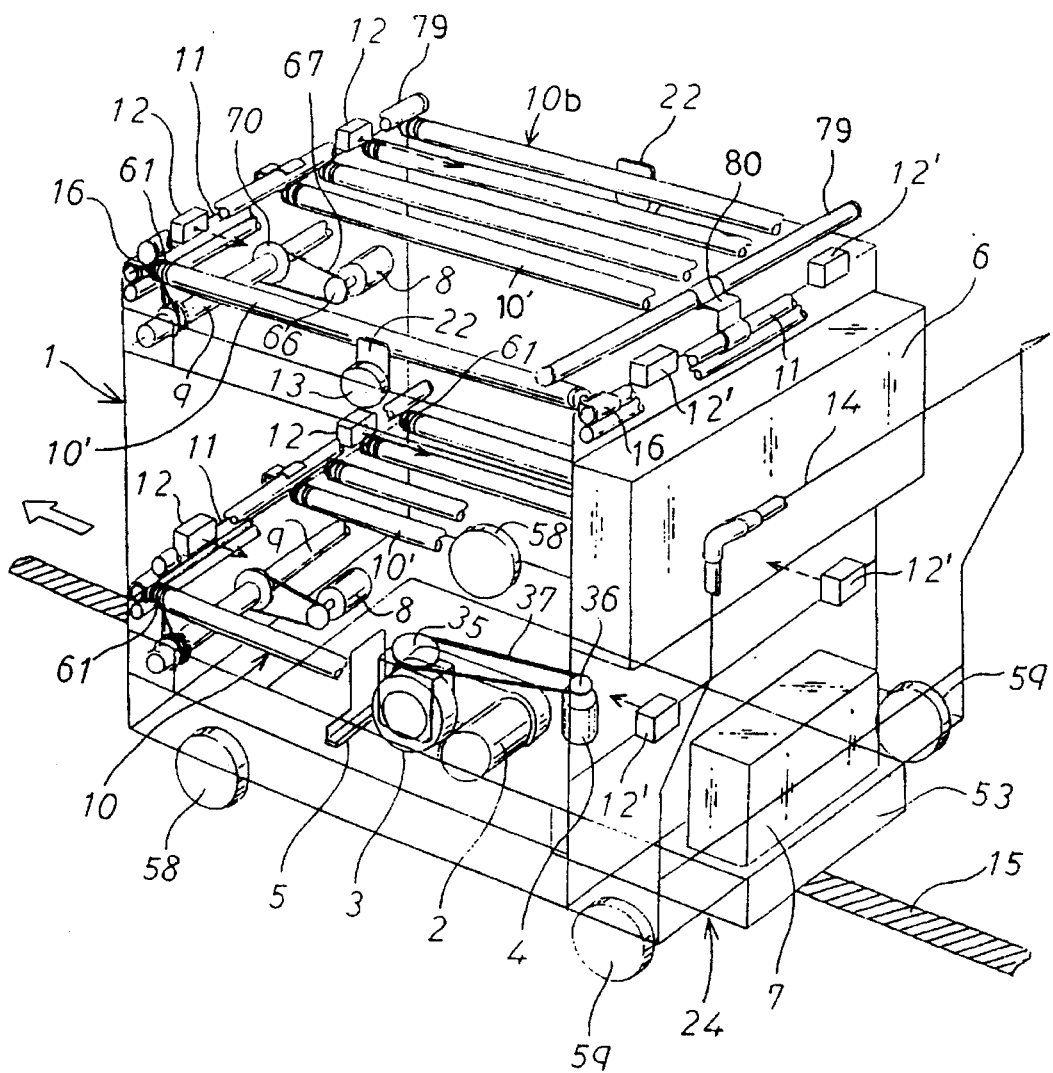
FIG. 4 is a diagonal view showing schematically the general construction of the magnetically guided vehicle according to the present invention.
Figure 5:
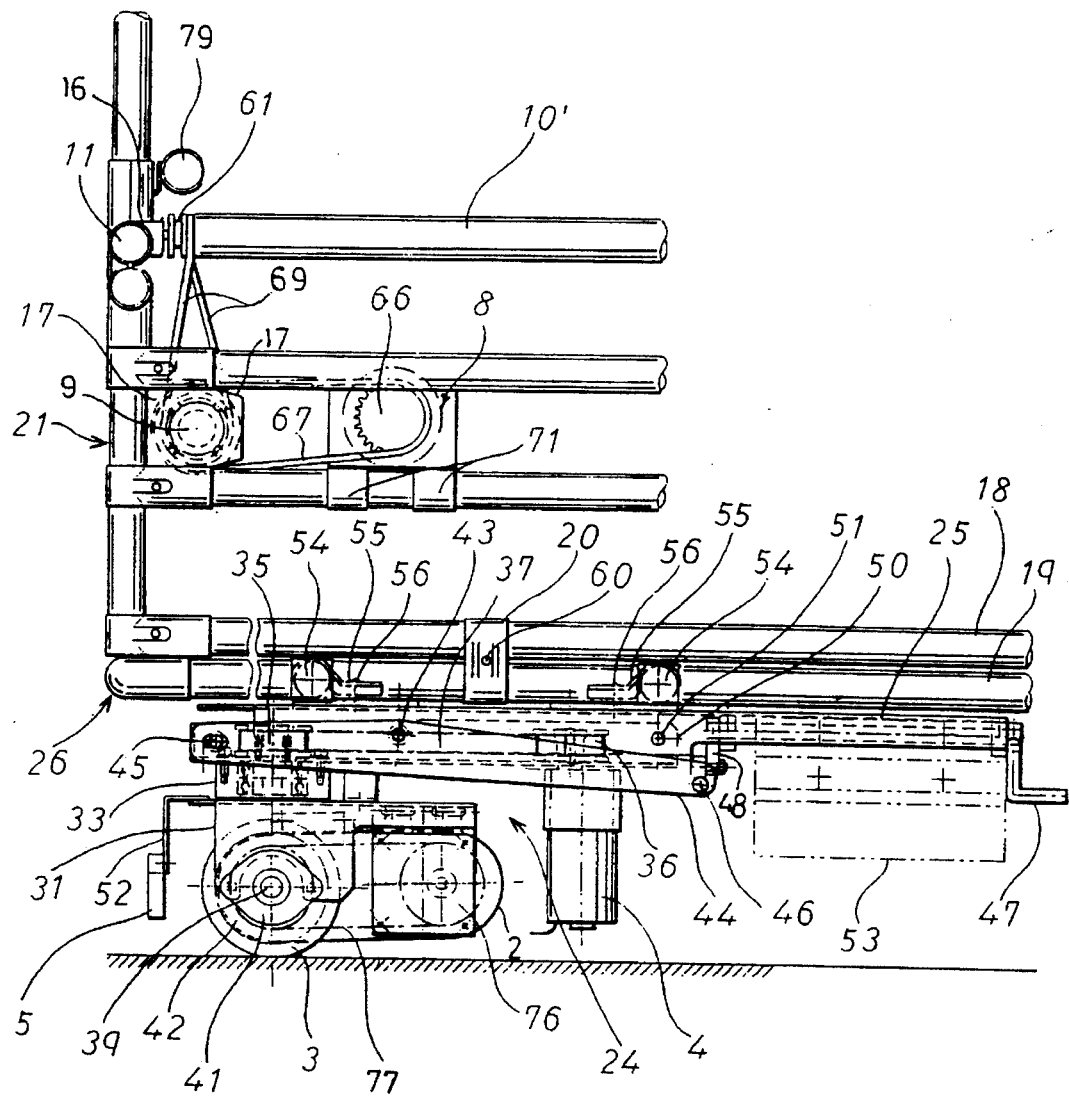
FIG. 5 is a side elevational view showing the main part of the magnetically guided vehicle according to the present invention.

Next, the actual construction of the AGV (the magnetically guided vehicle 1) is shown in FIGS. 3–5. This AGV is equipped with a magnetic sensor and a magnetic guide-type steering drive unit 24 which has a drive wheel 3 and a driving device for the wheel (such as driving motor 2). The AGV has a steering device under an attachment plate 25, a trolley 26 with four wheels at each of its corners, the front wheels having universal casters, which can be attached the lower surface of the chassis by the attachment plate 25 of the steering drive unit 24. The AGV also has a carriage shelf assembly 21 which has one or more layers of horizontal automatic conveyers as shelves and is mounted on the chassis of the trolley 26. The AGV in FIG. 4 is completed by detachably fixing the attachment plate 25 of the steering drive unit 24 to the lower surface of the chassis of the trolley 26 and by detachably mounting the carriage shelf assembly 21 onto the chassis of the trolley.

Figure 6:
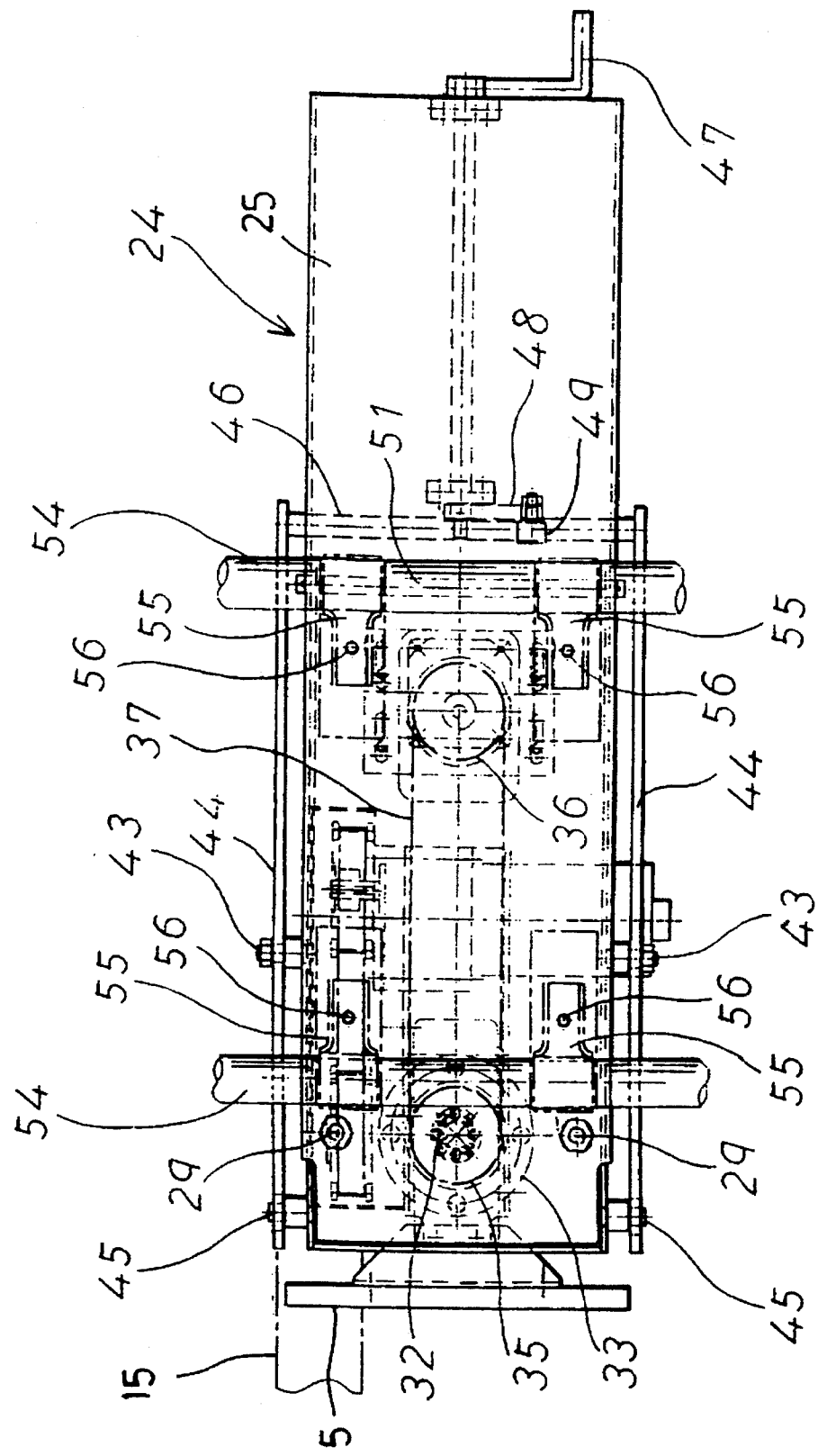
FIG. 6 is a plan view of the steering drive unit.
Figure 7:
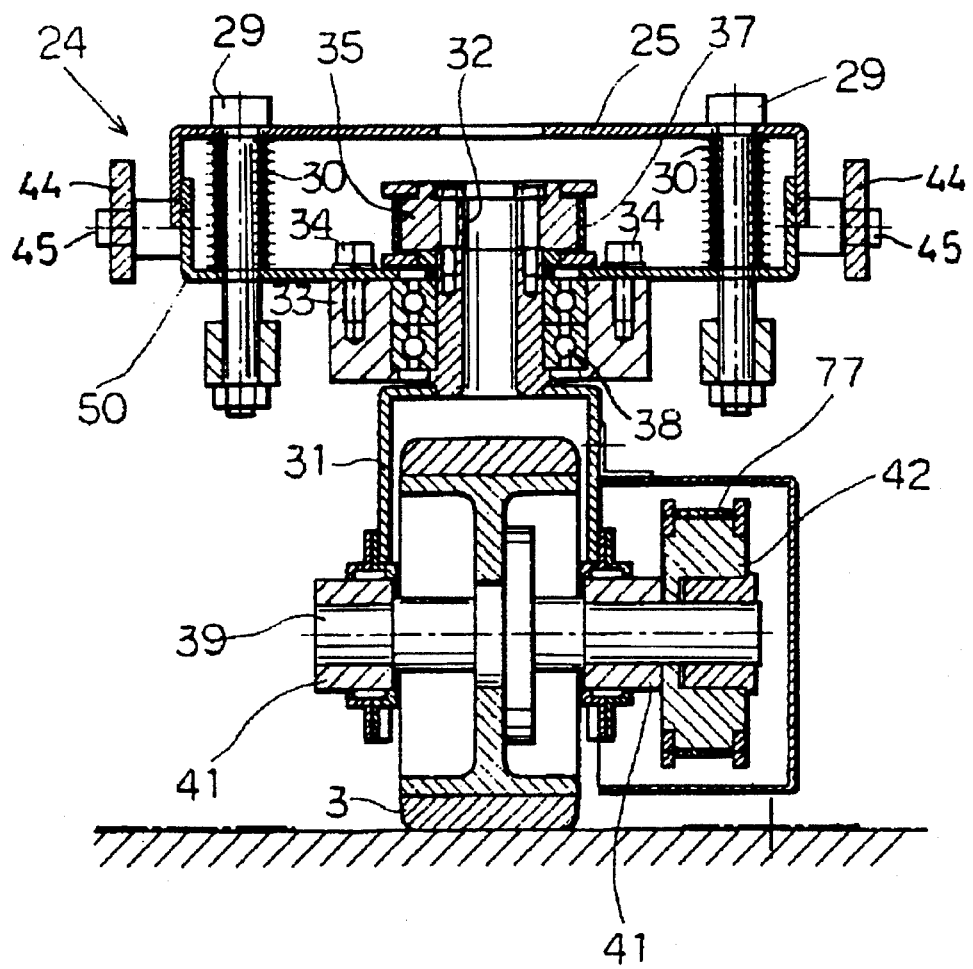
FIG. 7 is a sectional view showing in detail the drive wheel portion of the steering drive unit.

FIGS. 5–7 show the detailed construction of the magnetic guide type steering drive unit 24. The attachment plate 25, which is made of a steel plate both side edges of which are bent downward to form a shallow box, has dimensions of approximately 170×650 mm. As clearly shown in FIG. 7, under the attachment plate 25 a movable plate 50 is fitted which is also made of a steel plate, both side edges of which are bent upward to form a shallow box. These plates are connected rotatably at the rear portion of the overlapped side walls with a horizontal support pin 51 while in the front portion a pair of vertical guide pins 29, each having a buffer spring 30, are provided to permit vertical movement around the support pin 51. A bearing block 33 for a bearing 38 which rotatably supports a steering shaft 32 standing vertically from a holder 31 of the drive wheel 3 is fixed to the lower surface of the movable plate 50 with a number of screws 34. At the upper end of the steering shaft 32, which extends through the movable plate 50, a pulley 35 is mounted which is coupled with a driving pulley 36 of a steering motor 4 with a timing belt 37. The drive wheel 3 is steered automatically by the steering motor 4. The shaft 39 of the drive wheel 3 is supported at both ends rotatably by the side walls of the holder 31 by bearings 41. A pulley 42 mounted at one end of the shaft 39 is coupled with a drive pulley 76 of a driving motor 2 provided at the rear of the holder 31 with a timing belt 77. A battery 7 is provided at the rear of the trolley 26 (FIG. 4) as power source for the steering motor 4, the driving motor 2 and the motors for the automatic roller conveyers described below. A control device 53 which primarily governs the automatic control of the steering drive unit 24 is provided on the lower surface of the steering drive unit 24 (FIG. 5).

Figure 8:
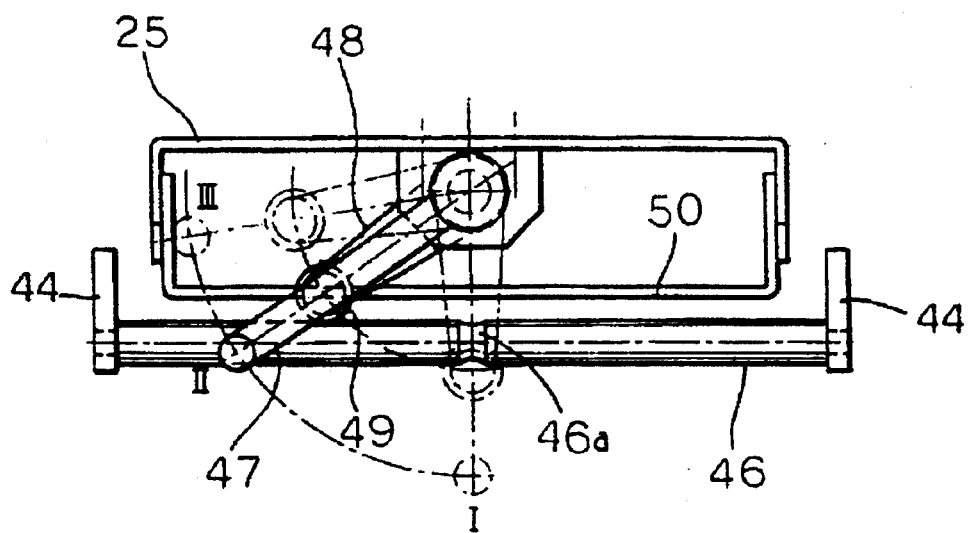
FIG. 8 is a back view showing the movement of the changeover handle which moves the drive wheel of the steering drive unit vertically.

Next, a changeover mechanism changes the drive wheel 3 from a position in which the wheel 3 touches the floor pushing up the attachment plate 25 with a pressure sufficient for running to a position in which the wheel is suspended with a clearance from the floor as shown in FIGS. 5, 6 and 8. The fore ends of the movable plate 50 are supported through a support axle 45 by the fore ends of a pair of levers 44 which are provided on either side of the attachment plate 25 and rotatably supported at the middle by a trunnion shaft 43. A tie rod 46 which couples the rear ends of the levers 44 is provided in such a manner that, as shown in FIG. 8, a cam follower 49 of an arm 48 which is turned by a manually operated changeover handle 47 presses against the rod 46. The changeover handle 47 and the arm 48 Form the same phase angle and, as shown in FIG. 8, as the handle is turned to the vertical position (I), the cam follower 49 is received stably in a recessed position 46a of the tie rod 46 and thereby presses down the tie rod 46 the lowest position. As a result, the movable plate 50 is turned upward about the fulcrum pin 51 following the levers 44 which are turned about the trunnion shaft 43 and pulls up the drive wheel 3 together with the holder 31 into the suspended position. In short, the drive wheel 3 is held in suspension under the chassis of the trolley 26 and the AGV is in a position to run on the front wheels 58 and the rear wheels 59. Conversely, if the changeover handle 47 is turned clockwise approximately 45 degrees as shown with a solid line in FIG. 8 to the position (II), the downward force exerted by the cam follower 49 against the tie rod 46 vanishes, whereupon not only the fore ends of the lever 44 come down through the turn about the trunnion shaft 43 due to the weight of the wheel 3 and others, but also the fore end of the movable plate 50 turns downward about the fulcrum pin 51, with the result that the drive wheel 3, together with the holder, comes down and, pressed by the buffer spring 30 generates the friction with the floor necessary and sufficient for running. Therefore, when the AGV must be hand-pushed in order to change of paths or to charge the battery, by turning said changeover handle to the vertical position (I) of FIG. 8 and thereby pulling up the drive wheel off the floor, the AGV can be moved in a light-load condition without the resistance of the driving means (the driving motor 2). Returning the manual handle 47 to position II of FIG. 8, the AGV is back in a position to run with the drive wheel 3. In response to unevenness of the floor, the cam follower 49 may rise to position III of FIG. 8 as the drive wheel 3 is pushed down by the buffer spring 30.

A magnetic tape sensor 5 is attached through a holding means 52 to the fore part of the holder 31 of the drive wheel 3 in the steering drive unit 24. A S/N magnetic sensor 40 is also attached to the holder 31 but the position of attachment is not shown. The signals detected by each of said magnetic sensors are input to a control device 53 and processed there. The control device 53 then controls said steering motor 4 and the driving motor 2 through the output (control signals), that is, the processed signals.

Next, the frame of the trolley 26 and the frame of the carriage shelf assembly 21 are constructed from resin-coated steel pipes connected with couplers formed by injection from synthetic resin such as polyethylene or with metal joints. The resin-coated steel pipes are of an outer diameter of 28 to 42 mm and made by first applying adhesive to the outer surface of thin steel pipe of a thickness of 0.6 mm, and then coating the pipe with thin layer of about 1 mm of synthetic resin such as ABS or AAS. Under the chassis of the trolley 26, constructed as described above, the attachment plate 25 of the steering drive unit 24 is introduced and mounted detachably by fastening hold plates 55 that are placed on the resin-coated steel pipes 54 constituting the chassis in such a manner as to hold the pipes in the semi-circular receivers with bolts 56 that ace screwed into attachment seats 57, of the attachment plate 25 (see FIG. 3). As a result of this, although the trolley 26 has a pair of front wheels 58 and a pair of rear wheels 59 on the lower surface of the chassis, the trolley is run through the revolutions of the single drive wheel 3 of said steering drive unit 24 and is steered according in the direction of the drive wheel 3, the trolley serving only as a carrier bed. Numeral 14 in FIG. 3 and 4 designates a handle for hand pushing.

Figure 9:
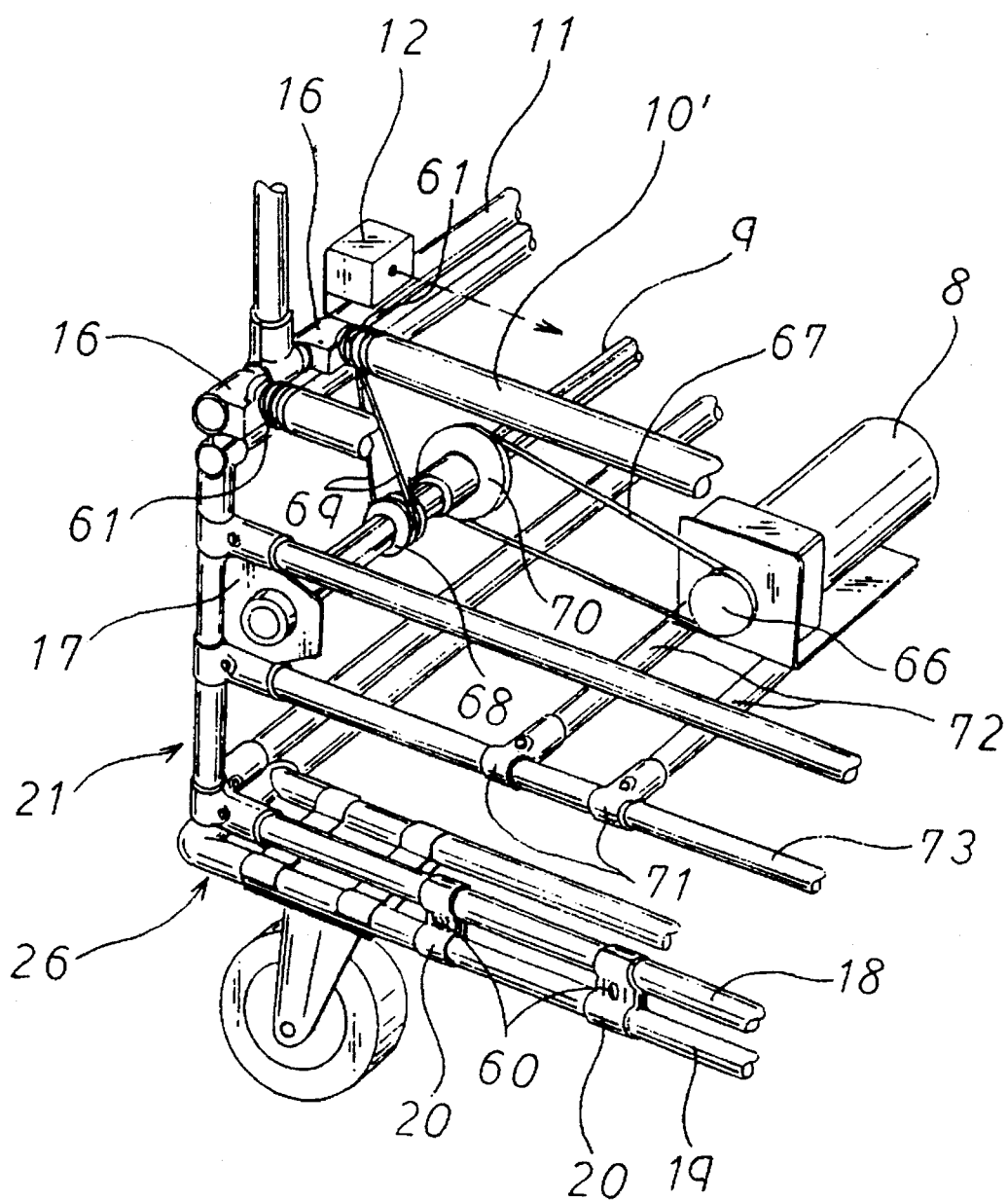
FIG. 9 is a diagonal view showing the construction of the roller conveyer of the carriage shelf assembly for the magnetically guided vehicle.
Figure 10:
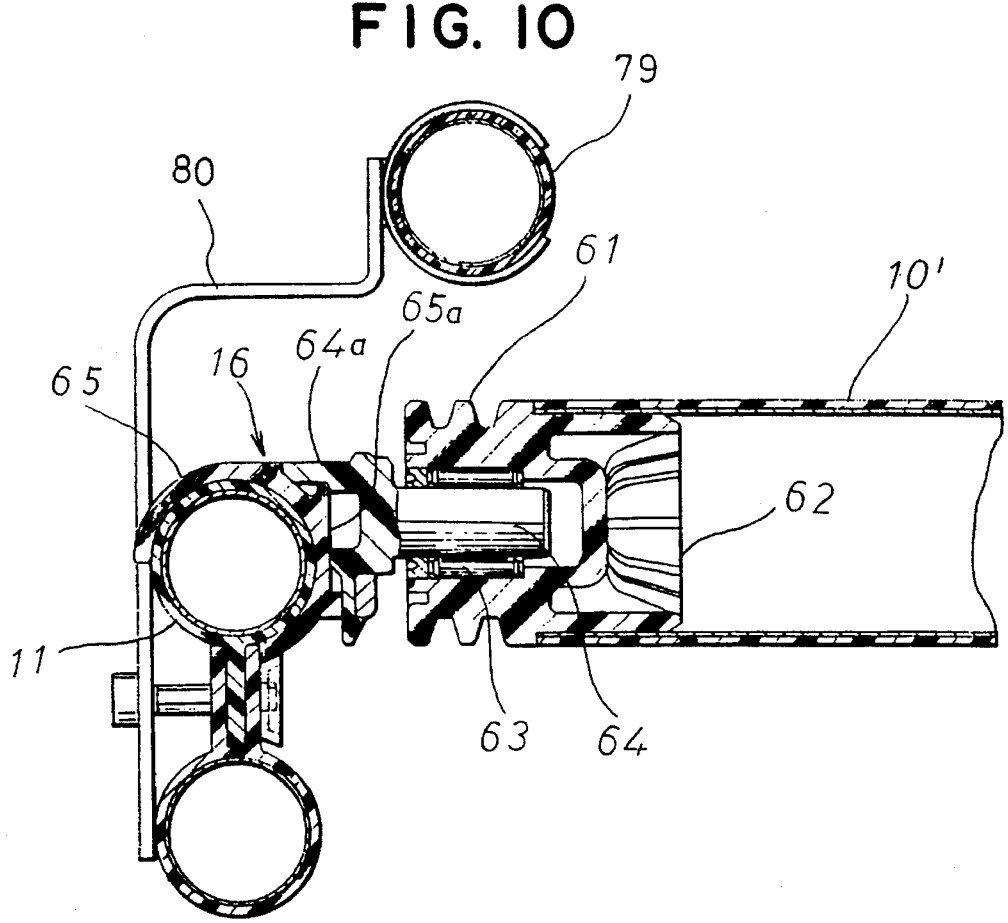
FIG. 10 is a sectional view showing the bearing means portion of the roller conveyer for the carriage shelf assembly; and, FIG. 11 is a diagonal view of the stopper means to prevent a load from falling off the roller conveyer.

The carriage shelf assembly, for which the frame is constructed from resin-coated steel pipes as described above, is mounted detachably by placing the lower resin-coated steel pipes 18 of the frame of the trolley 26 directly on the peripheral resin-coated steel pipes 19 constituting the chassis of the trolley 26, clamping them with two-piece type eyeglasses-shaped couplers 20, and fastening the middle part of said couplers firmly with screws 60 and nuts. This carriage shelf assembly 21 is provided with two layers of automatic roller conveyers 10a and 10b which also serve as shelves. Both of them are of the same construction and have a number of rollers 10' arranged at a constant pitch parallel to the direction of the forward movement of the AGV. Each of the rollers 10' is supported rotatably at both ends thereof by bearing means 16 attached to the longitudinal members 11 of the resin-coated steel pipes constituting the carriage shelf assembly 21. The construction of one of the rollers 10' and the bearing means 11 are shown in detail in FIG. 10. The roller 10' is made by cutting a resin-coated pipe to a suitable length and has at each end a bearing bush 62, which serves also as a pulley 61, made of a kind of plastic inserted into the hollow and fixed there by adhesion. The base end 64a of a support axle 64 which, inserted into a needle bearing 63 at the center of said bearing bush 62, supports said roller 10', is inserted and fixed in a glove 65a of a coupler 65 for bearing which bites said resin-coated steel pipe 11 and is fixed firmly through adhesion. In short, all the members constituting the rollers 10', the bearing means 16 thereof and the frame of the carriage shelf assembly are made of a synthetic resin or resin-coated steel pipes and hence do not have the cold feel or heaviness of naked metal. Moreover they manifest excellent corrosion resistance to water, sea water, agricultural chemicals or other corrosive gases. Each pulley 61 for the rollers 10' is individually connected with a cross-spanned belt 69 to the pulley 68 of a drive shaft 9. The drive shaft 9, which has a castellated surface, is provided directly under the rollers 10' in a perpendicular direction and is supported rotatably by bearing panels 17 (FIG. 9) which are attached to the resin-coated steel pipes constituting the frame of the carriage shelf assembly. On the drive shaft 9, together with said pulley 68, a driven pulley 70 is mounted which is connected with a drive pulley 66 by a belt 67. Each roller 10' of the upper and lower automatic conveyers 10b, 10a is controlled for rotation start and stop, the direction of rotation and revolution rate by a roller-driving motor 8 which is automatically controlled by a control device 6 (FIG. 4) provided in the rear of the carriage shelf assembly 21. This control device 6 shares a signal circuit with the control device 53 of the steering drive unit described above and is interlocked therewith. In some cases, these two control devices 6 and 53 may be combined into one device. Each of the roller-driving motors 8 is provided on a pair of the resin-coated steel pipes 72 that are connected to the resin-coated steel pipes 73 constituting the frame of the carriage shelf assembly 21 with two-piece screw-clamp type metal joints 71 (FIG. 9). To drive the rollers 10', a one-sided drive system with a pulley 61 can be provided on only one side of each of the rollers 10', or a two-sided drive system with two pulleys, one on either side, can be provided. These can also be accompanied by a pair of parallel drive shafts 9 which are driven by a common driving motor, or some other two-sided drive system wherein each driving shaft 9 is driven individually by a drive motor 8, as appropriate.

As watch sensors to sense a load coming onto or going off of the upper and lower automatic conveyers 10b and 10a, a set of photoelectric switches each having a light emitter 12 which emits watch light, as shown in FIG. 4, in a direction parallel to the rollers 10' with a receiver 12' which receives and executes photoelectric conversion of the emitted light, is mounted at each of the front and rear sides of the conveyers using the resin-coated steel pipes 11 constituting the frame of the carriage shelf assembly 21. As a load comes onto one of the automatic conveyers, the interception of the light by the load first at the entrance and then, as the load reaches the end of the conveyer, at the rear, are detected as signals and input into control device 6. The control device 6 processes the signals and stops the roller-driving motors 8. The two sensors also sense the load as it leaves the conveyer and the detected signals drive the roller-driving motors 8 through the control device 6.

Figure 11:
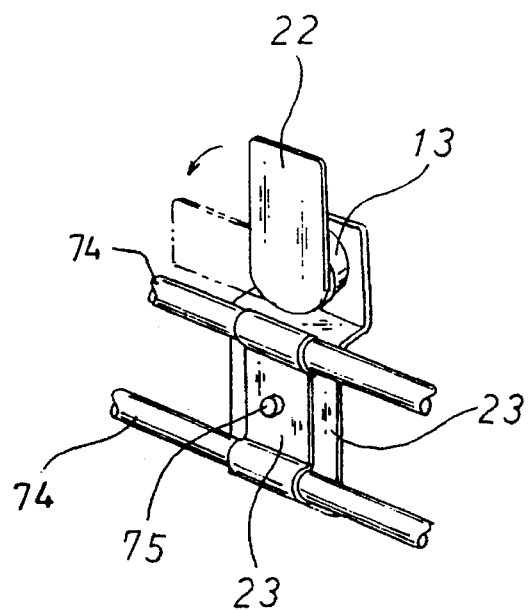

On the upper and lower automatic conveyers 10b and 10a, approximately at the middle of the entrance and rear edges, stoppers 22 which can be turned up and down are attached via rotary solenoids 13 to prevent overrun and the dropping of a load, as shown in FIGS. 4 and 11. Utilizing a pair of upper and lower horizontal resin-coated steel pipes 74 constituting the frame of the carriage shelf assembly 21, on both of the front and rear sides of the conveyer, a metal piece 23 is attached and fixed with a screw 75 and the rotary solenoid 13 is mounted on the metal piece 23. Of the two rotary solenoids 13, the one on the rear side is basically always kept in the upright position and serves as a stopper to prevent the falling of a load due to an overrun. On the other hand, the rotary solenoid 13 on the entrance side is given a signal to turn the stopper 22 about 90 degrees downward as a start signal is given to the roller-driving motors 8 from the control device 6 to take on a load. As the two watch sensors emit the signal that a load has entered and the signal that the load has reached the rear of the shelf, the stopper is controlled to stand upright to prevent the falling of the load from the front edge. Roughly the same control process takes place when a load is taken off of the conveyer. The above off case, in which a load comes on from the entrance side and also goes off from the entrance side, is described above. This, however, is not always the case. It is also feasible for a load to come on from the entrance side and go off the exit side. The numeral 79 in the figures designates guide pipes which are provided on both sides of the automatic conveyers 10b and 10a parallel to the direction of movement of the load and are supported by joints 80. These guide pipes 79 guide the load for entrance and exit and prevent a sideways fall of the load.

What is claimed is:

1. A magnetically guided vehicle system comprising guide paths consisting of magnetic tape laid along path lines, a magnetic guide type steering drive unit having a magnetic sensor to detect magnetism from said tape and a drive wheel, said steering drive unit having a driving means to drive said drive wheel and a steering means both provided under an attachment plate and controlled automatically through a control means that processes signals detected by said magnetic sensor, a trolley which has a wheel at each of the four corners of the lower surface of a chassis thereof, the front said wheels having universal casters;

and has said attachment plate for said steering drive unit fixed onto the lower surface of said chassis thereof;

and a carriage shelf assembly which has one or a plurality of horizontal automatic roller conveyer(s) as shelves which is mounted on said chassis of said trolley, said attachment plate being fixed detachably to the lower surface of said chassis, said carriage shelves also being mounted detachably onto said chassis, and said automatic conveyers being operated automatically according to a signal transmitted thereto when a load handling position designated by a portion of magnetic tape laid on the path is detected.

2. The magnetically guided vehicle system according to claim 1 wherein said drive wheel of said steering drive unit is attached to a mechanism which moves vertically by a stroke sufficient to move said wheel from a position wherein said wheel touches the floor, pushing up said attachment plate fixed on the lower surface of said chassis with a pressure necessary for running to a position wherein the wheel is suspended off the floor, a changeover handle to move vertically said drive wheel is provided at the rear of the chassis.

3. The magnetically guided vehicle system according to claim 1 wherein the frames of said chassis and said carriage shelf assembly are constructed by connecting resin-coated steel pipes with connecters;

said attachment plate of said steering drive unit is detachably mounted by fastening hold plates which receive said resin-coated steel pipes to attachment seats of said attachment plate with bolts;

and said carriage shelf assembly is mounted detachably by fastening with bolts and nuts two-piece connecters that clamp symmetrically said resin-coated steel pipes constituting said frame of said carriage shelf assembly and said steel pipes constituting said frame of said trolley chassis.

4. The magnetically guided vehicle system according to claim 1 wherein said automatic conveyers of said carriage shelf assembly consist of rollers made of resin-coated steel pipes cut to a suitable length and supported rotatably by conveyer frame bearing means at both ends, said rollers being plural in number and arranged parallel with each other at a constant pitch and driven in a common direction at a common revolution rate;

said automatic conveyers having sensors provided at both entrance and exit sides thereof to sense on-coming and off-going loads, and said automatic conveyers also having a stopper means, that can be either turned up or turned down, for stopping or allowing movement of said loads at both entrance and exit sides.

* * * * *